United States Patent [19]

Larsen

[11] Patent Number: 4,691,493
[45] Date of Patent: Sep. 8, 1987

[54] THIN PLATE STRUCTURE

[75] Inventor: Anders Larsen, Haslev, Denmark

[73] Assignee: Nord-Plan Stålreoler A/S, Vipperød, Denmark

[21] Appl. No.: 794,191

[22] Filed: Nov. 1, 1985

[30] Foreign Application Priority Data

Nov. 15, 1984 [DK] Denmark .......................... 5436/84

[51] Int. Cl.$^4$ .......................... E04C 1/30; E04C 2/42; E04C 3/04
[52] U.S. Cl. ........................................ 52/588; 52/177; 52/581; 52/670; 52/732
[58] Field of Search .................. 52/660, 663, 670, 581, 52/588, 732, 180, 177

[56] References Cited

U.S. PATENT DOCUMENTS

| 765,963 | 7/1904 | Evans | 52/581 |
|---|---|---|---|
| 1,076,017 | 10/1913 | Chase | 52/180 |
| 1,852,833 | 4/1932 | Borsky et al. | 52/732 |
| 3,033,086 | 5/1962 | Marsden | 52/660 |
| 3,108,406 | 10/1963 | Ellis | 52/670 |
| 4,098,493 | 7/1978 | Logan | 52/581 |
| 4,198,795 | 4/1980 | Barnidge | 52/180 |

FOREIGN PATENT DOCUMENTS

| 246389 | 8/1963 | Australia | 52/177 |
|---|---|---|---|
| 507261 | 11/1954 | Canada | 52/588 |
| 3128505 | 2/1983 | Fed. Rep. of Germany | 52/660 |
| 529204 | 11/1940 | United Kingdom | 52/177 |

Primary Examiner—William F. Pate, III
Assistant Examiner—Michael Safavi
Attorney, Agent, or Firm—Fitch, Even, Tabin & Flannery

[57] ABSTRACT

A thin plate structure such as a deck structure for, for instance, a footbridge comprises at least two abutting and substantially horizontally arranged profiled girders. Each girder comprises at least two substantially vertical plate-shaped side members. The girders are interconnected two by two by means of a plurality of connection fittings in these side members. These connection fittings are formed by locking lifting and comprising at least one downwardly pointing locking tongue cut out in one of the side members of each girder. Along a preferably horizontally extending bent bending area the locking tongue is bent in an offset manner outwards. The locking tongue co-operates with a locking tongue opening punched out opposite the locking tongue in the abutting side member of the adjacent girder as well as with at least one upwardly pointing locking gill punched out of one of the side members in each girder. This locking gill is bent outwards in an offset manner along a preferably horizontally extending bending area and co-operates with a locking gill opening punched out opposite the locking gill in the abutting side member of the adjacent girder. The side members are furthermore so resilient that they allow an insertion of the locking tongue and the locking gill into the locking tongue opening and the locking gill opening, respectively, in such a manner that the upward rim surface of the locking gill is made abutting the downward rim surface of the locking gill opening, the downward side of the bending area of the locking tongue is made abutting the upward rim surface of the locking tongue opening, and the uppermost area of the inner side of the locking tongue opening is made abutting the area of the inner side of the side member, said area abutting the above rim surface. Through the locking fittings the thin plate structure can transfer forces (stresses) from the concentrated loads on one part of the thin plate structure to other parts thereof without causing mutual displacements of the girders.

13 Claims, 10 Drawing Figures

THIN PLATE STRUCTURE

FIELD OF THE INVENTION

The invention relates to a thin plate structure such as a deck structure for, for instance, a footbridge and comprising at least two abutting, substantially horizontally placed profiled girders, each girder comprising at least two substantially vertical plate-shaped side members, and whereby the girders are interconnected two by two by means of a plurality of connecting means in the side members.

DESCRIPTION OF THE PRIOR ART

It is known to use a thin plate structure of this type for inter alia footbridges. This structure comprises a plurality of girders positioned side by side and interconnected two by two by means of a plurality of connecting means. These thin plate structures are, however, difficult to assemble, requiring much work. Furthermore the connecting means are unable to transfer and distribute loads from one part of the structure to other parts of the structure without causing small mutual displacements of said parts.

SUMMARY OF THE INVENTION

The object of the invention is to provide a thin plate structure of the above type, whereby the girders can be assembled easily and quickly into a continuous thin plate structure, and whereby the forces from the concentrated loads influencing part of the structure can be transferred to other parts of the structure without causing a mutual displacement of the individual girders.

The thin plate structure according to the invention is characterized in that the connecting means are locking means comprising at least one downwardly pointing locking tongue cut out in one of the side members of each girder, said locking tongue being bent outwards to an offset manner along a preferably horizontally extending curved bending area and furthermore co-operating with a locking tongue opening punched out opposite the locking tongue in the abutting side member of the adjacent girder, and in that the locking means comprises at least one upward locking gill cut out in one of the side members of each girder, said locking gill being bent outwards in an offset manner along a preferably horizontally extending bending area and furthermore co-operating with a locking gill opening punched out opposite the locking gill in the abutting side member of the adjacent girder, and that the side members furthermore are so resilient that they allow an insertion of the locking tongue and the locking gill into the locking tongue opening and the locking gill opening, respectively, in such a manner that the upward rim surface of the locking gill is made abutting the downward rim surface of the locking gill opening, the downward side of the bending area of the locking tongue is made abutting the upward rim surface of the locking tongue opening, and the uppermost area of the inner side of the locking tongue is made abutting the area of the inner side of the side member abutting said rim surface. As a result the girders can be assembled in a simple and easy manner into a continuous thin plate structure. This structure is able to transfer the forces from the concentrated loads on one structure part to other structural parts through the locking means without said parts thereby being mutually displaced. The forces can be transferred in the plane of the side members as well as perpendicularly thereto. Furthermore, bolted connections are completely avoided.

According to the invention the locking tongue may comprise a first tongue part preferably extending downward from the bending area of the locking tongue, the distance from the first tongue part to the outer side of the side member corresponding to the material thickness of the latter, and a second tongue part bent outwards in an offset manner in extension of the first tongue part and preferably extending downwards, the distance from this tongue part to the outer side of the side member being greater than the material thickness of the latter, and the curvature of the bending area may furthermore correspond to the curvature of the abutting area of the locking tongue in the locking tongue opening. In this manner the locking tongue engages the associated locking tongue opening in the side member of the adjacent girder in a solid and reliable manner when the girders are assembled. In addition, the mounting of the thin plate structure is facilitated as the second tongue part of the locking tongue engages the associated locking tongue opening in an easy manner when two girders are to be assembled.

Furthermore according to the invention the bending area of the locking tongue and the abutting area of the locking tongue opening may be curved, which implies that the structure is particularly simple and that forces can be transferred both in vertically downward direction and horizontally in the plane of the side members between the bending area of the locking tongue and the abutting area of the locking tongue opening.

In addition according to the invention the bending area of the locking tongue and the abutting area of the locking tongue opening may be V-shaped with the point facing downwards. In this manner the structure is very strong. Moreover the locking tongue is fixed exactly in the locking tongue opening at the same time as relatively great horizontal shearing forces can be transferred in the plane of the side members between the bending area of the locking tongue and the abutting area of the locking tongue opening.

Furthermore according to the invention the bending area of the locking tongue and the abutting area of the locking tongue opening may extend straight on a preferably horizontal plane, and the side rims of the locking tongue may converge to one another below the bending area. The latter feature implies that the locking tongue engages the locking tongue opening easily in such a manner that the thin plate structure is easy to assemble. The relatively great horizontal abutting surface ensures furthermore that relatively great downward vertical forces can be transferred between the bending area of the locking tongue and the abutting area of the locking tongue opening.

Moreover according to the invntion the locking gill may be bent so far from the side member that the inner rim of its upward rim surface preferably flushes with the outer side of the side member, and the upward rim surface of the locking gill may furthermore have a curvature corresponding to the curvature of the abutting area of the locking gill in the locking gill opening. As a result the girders of the thin plate structure are locked to one another when assembled without a possibility of being mutually displaced. The girders can, however, be easily taken down again by mutually twisting neighboring girders perpendicular to the plane of the side members in such a manner that the locking gills disengage their respective locking gill openings.

Furthermore according to the invention the uppermost rim surface of the locking gill and the abutting surface of the locking gill opening may be curved, which implies that the structure is particularly simple and inexpensive, and furthermore that forces can be transferred between the locking gill and the abutting surface of the locking gill opening both in the vertical direction and horizontally in the plane of the side members.

In addition according to the invention the uppermost rim surface of the locking gill and the abutting area of the locking gill opening may be V-shpaed with the point facing upwards. In this manner the locking gill is fixed very accurately in the locking gill opening at the assembling at the same time as relatively great horizontal forces can be transferred in the plane of the side members.

Moreover according to the invention the upward rim surface of the locking gill and the abutting surface of the locking gill opening may extend straight substantially in a horizontal plane. This relatively great horizontal abutting surface implies that relatively great vertical forces can be transferred between the locking gill and the locking gill opening.

Furthermore according to the invention the locking tongue opening and the locking gill opening may be the same opening, whereby the structure is very simple and inexpensive and simultaneously very strong and stable, the locking means being formed with the greatest possible dimensions relative to the height of the side members.

The respective locking means may according to the invention be placed in a single, substantially horizontal row in the side members of each girder. As a result two girders can be assembled in an easy and simple manenr by the locking tongues of one girder being inserted in the locking gills of the second girder while the girders are positioned in such a manner that their side members form an acute angle whereafter the final locking is established by turning the girders in such a manner that their side members abut one another.

Moreover according to the invention the distance between the succeeding sets of locking means of the horizontally extending row thereof may correspond to 3-15 times the height of the side members, preferably 7-11 times this height. In this manner the side members of the girders comprise sufficient locking means for transferring the loads that the thin plate structure shoudl be able to absorb.

Finally according to the invention the height of the locking tongue opening and the height of the locking gill opening may together amount to between 0.2-0.6 times the height of the sid emembers, preferably 0.3-0.5 times this height. As a result, the connecting means are formed with such dimensions that they are able to transfer the forces they are subjected to during the load of the thin plate structure. At the same time the side members maintain such a strength that they can absorb the forces they are subjected to.

BRIEF DESCRIPTION OF THE DRAWING

The invention will be described below with reference to the accompanying drawing, in which.

DESCRIPTION OF PREFERRED EMBODIMENTS

Figure 1:
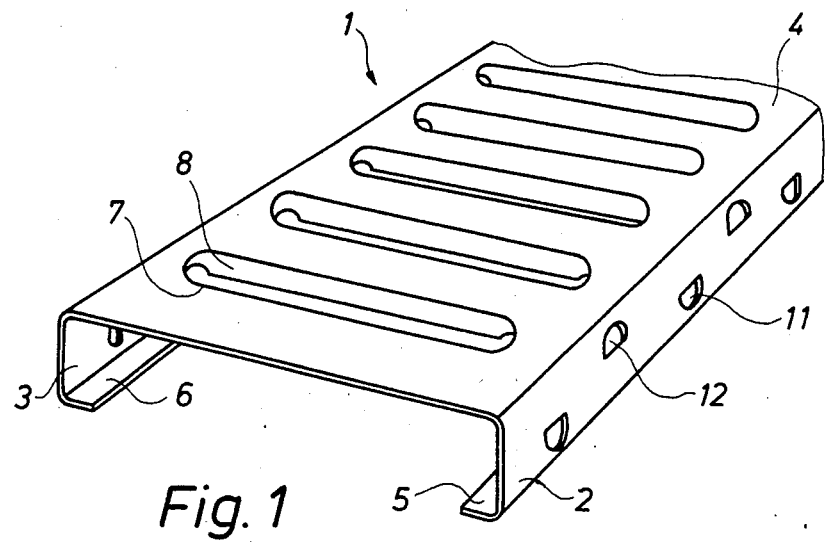
FIG. 1 is a perspective view of a girder for the thin plate structure according to the invention.
Figures 2, 3:
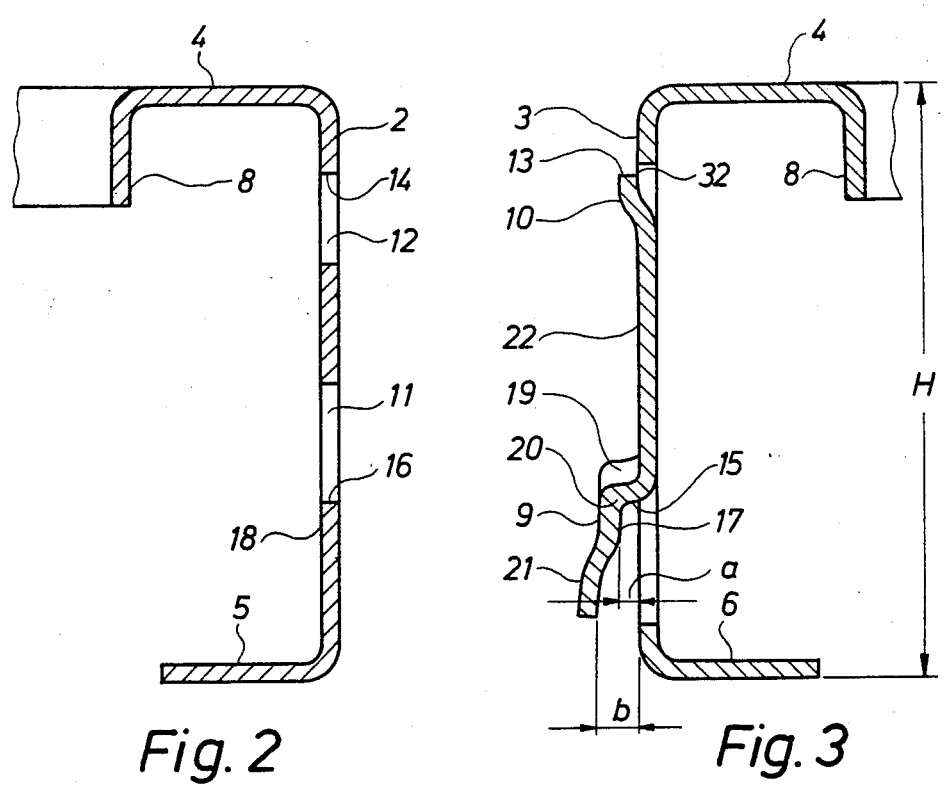
FIG. 2 is on a larger scale a fractional view of a girder with a locking tongue opening at the bottom and a locking gill opening at the top.
FIG. 3 is on a larger scale a fractional view of a girder with a locking tongue at the bottom and a locking gill at the top.
Figures 4, 5:
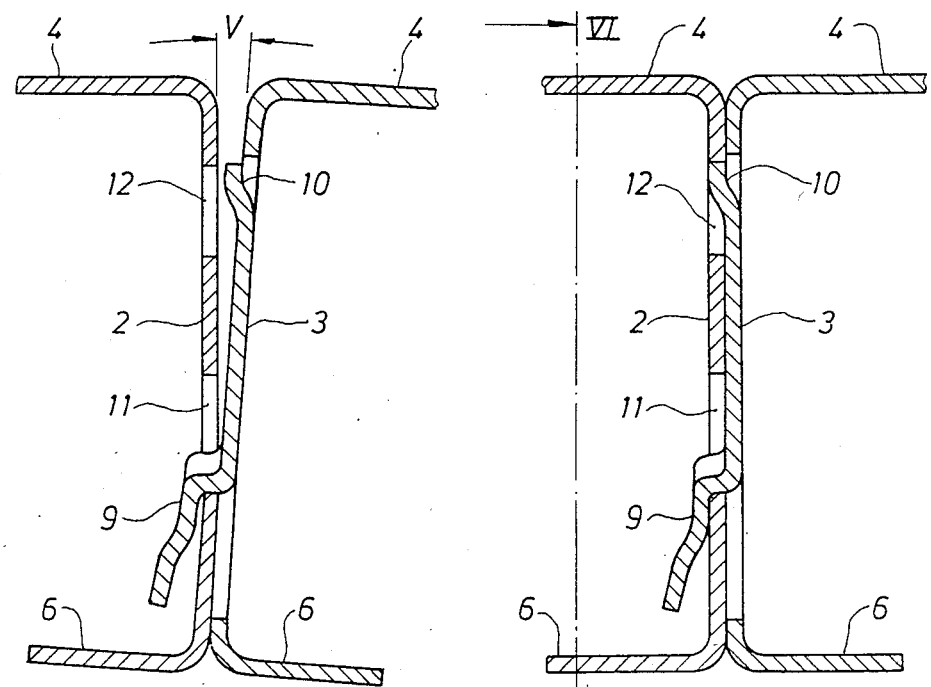
FIG. 4 illustrates the girders of FIGS. 2 and 3, whereby the locking tongue of the girder of FIG. 3 has been inserted into the locking tongue opening of the girder of FIG. 2 while the girders are positioned in such a manner that their side members form an acute angle, FIG. 5 corresponds to FIG. 4, but whereby the locking gill has been inserted into the locking gill opening, the girders being turned in such a manner that their side members but one another.

FIG. 1 illustrates an embodiment of a girder 1 for making a thin plate structure according to the invention. The girder 1 comprises two substantially vertical side members 2, 3 made of plate, a body plate 4 connecting said side members, and two webs 5, 6 bent 90° inwards along the lowermost rims of the side members 2, 3 and serving to reinforce the girder 1. A row of elongated openings 7 are punched out transversely to the body plate 4. Along the rims these openings comprise rim reinforcements 8 bent 90° downwards and serving to reinforce the body plate 4 in such a manner that said plate can stand loads deriving from walking or driving on the thin plate structure. FIGS.2 and 3 are fractional views of the girders 1, whereby the side member 2 and the side member 3, respectively, appear. A locking tongue 9 is cut out of the side member 3 and bent outwards in an offset manner, Furthermore a locking gill 10 is cut out of the side member 3 and also bent outwards in an offset manner. The locking tongue 90 co-operates with a locking tongue opening 11 punched out opposite said locking tongue in the abutting side member 2 of the adjacent girder. The locking gill 10 co-operates with an opposing locking gill opening 12 also punched out of the abutting side member 2 of the adjacent girder. When two girders are to be assembled, the locking tongue 9 is inserted into the associated locking tongue opening 11 of the second girder, cf. FIG. 4. The side members 2, 3 are so resilient that during this operation they can be deformed to such an extent in the area of the locking tongue opening 11 and at the locking tongue 9, respectively, that the side members form an acute angle V of preferably about 5° above this area. In this manner sufficient distance appears between the two side members 2, 3 to allow an insertion of the locking gill 10 downwards along the side member 2 of the adjacent girder, said locking gill 10 projecting outwards. When the locking gill 10 has reached the position opposite the abutting locking gill opening 12 of the adjacent girder, the assembling of the two girders is completed by their resilient, deformed side members 2, 3 being straightened out, cf. FIG. 5, in such a manner that in the uppermost area these girders are also abutting one another, whereby the locking gill 10 is inserted into the locking gill opening 12. Now the two girders are locked together as the upward rim surface 13 of the locking gill 10 abuts the downward rim surface 14 of the locking gill opening 12, the downward side 15 of the bending area 19 of the locking tongue 9 abuts the upward rim surface 16 of the locking tongue opening 11, and the uppermost area of the inner side 17 of the locking tongue 9 abuts the area 18 of the inner side of the side member 2, said area 18 abutting the rim surface 16. In this manner by successively mounting one girder after the other an assembled continuous thin plate structure is provided. The girders of this thin plate structure are locked together in such a manner that loads on one part of the thin plate structure are transferred in all directions to other parts of said thin plate structure without thereby displacing the girders relative to one another. The thin plate structure can be taken down again by twisting reversibly the girders two and two about 5° from one another in such a manner that the locking gill 10 disengages the associated locking gill opening 12 whereafter the girders are separated, the locking tongue 9 being pulled out of the associated locking tongue opening 11.

As illustrated in FIG. 3, the locking tongue 9 comprises a first locking tongue part 20 preferably extending downwards from the bending area 19 of the locking tongue, the distance a from this first locking tongue part 20 to the outer side 22 of the side member 3 corresponding to the material thickness of the side member 2. As a result, the engagement of the locking tongue 9 with the locking tongue opening 11 allows a transfer of forces perpendicular to the plane of the side members 2,3 without the girders thereby being mutually displaced. The locking tongue 9 comprises furthermore a second locking tongue part 21 bent outwards in an offset manner and in extension of the first locking tongue part 20, the distance b from this second tongue part 21 to the outer side 22 of the side member 3 being greater than the material thickness of the side member 2. The latter facilitates the mounting of the girders as the locking gill opening 11 easily engages the second tongue part 21 of the locking tongue. The curvature of the bending area 19 of the locking tongue 9 corresponds to the curvature of the abutting area 26 of the locking tongue in the locking tongue opening 11 in such a manner that the locking tongue engages the associated locking tongue opening 11 in a strong and reliable manner when the girders are being assembled.

Figure 6:
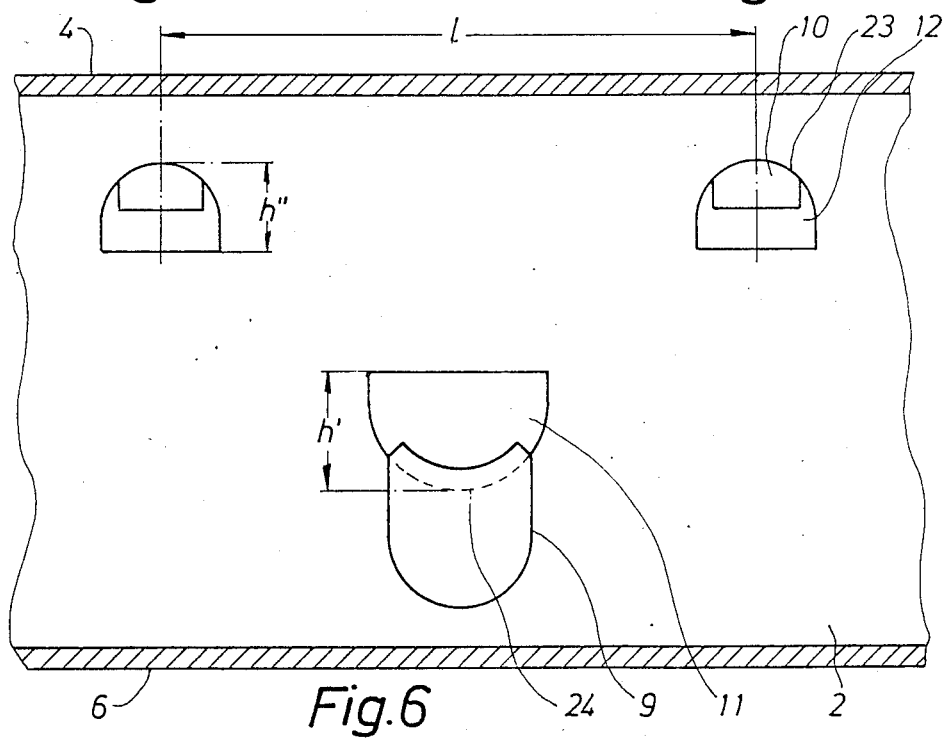
FIG. 6 is a fractional view taken along the linve VI—VI of FIG. 5, whereby a set of locking tongues and two sets of locking gills with curved abutting areas appear.

At the top FIG. 6 illustrates two sets of locking gill means 10, 12, each set comprising a locking gill 10 and a locking gill opening 12. At the bottom FIG. 6 illustrates a set of locking tongue means 9, 11, said set comprising a locking tongue 9 and a locking tongue opening 11. Both the locking gill means 10, 12 and the locking tongue means 9, 11 comprise in this embodiment curved abutting areas 23 and 24, respectively. This embodiment is particularly simple and inexpensive. Here the locking gill means 10, 12 are placed over the locking tongue means 9, 11 at the same time as they are displaced relative thereto in the longitudinal direction of the girders. The locking gill means 10, 12 may, however, also be placed next to or below the locking tongue means 9, 11, and the two sets of locking means 9, 11 and 10,12, respectively, may furthermore be positioned vertically above or below one another.

Figure 7:
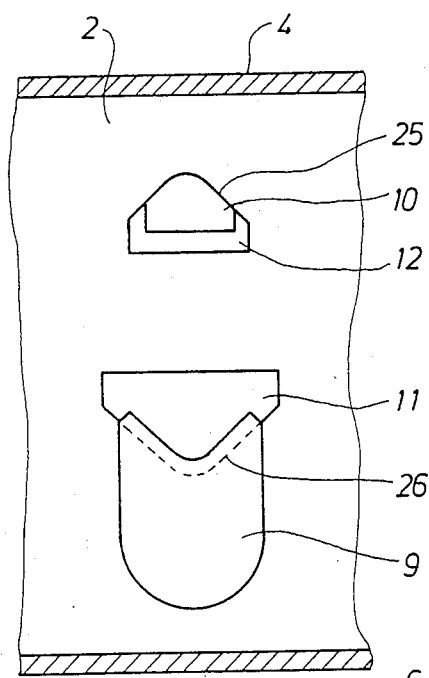
FIG. 7 is a side view, partly in section, of a second embodiment of the locking tongue and locking gill means with V-shaped abutting areas.

FIG. 7 illustrates a second embodiment of the locking gill means 10, 12 and the locking tongue means 9,11. Here the abutting area 25 of the locking gill means is V-shaped with the point facing upwards, and the abutting area 26 of the locking tongue means 9, 11 is also V-shaped but with this point facing downwards. In this manner it is possible through the abutting areas to transfer relatively great horizontal forces in the plane of the side members.

Figure 8:
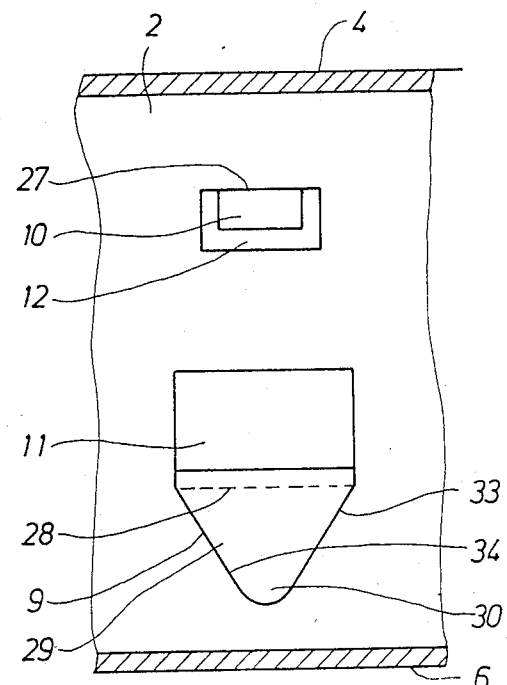
FIG. 8 is a side view, partly in section, of a third embodiment of the locking tongue and locking gill means with abutting areas extending straight in a preferably horizontal plane.

FIG. 8 illustrates a third embodiment of the locking gill means 10, 12 and the locking tongue means 9, 11. In this embodiment the abutting areas of both sets of locking means extend straight in a preferably horizontal plane and are able to transfer relatively great vertical forces. The first and second locking tongue part 29, 30 of the locking tongue 9 form a V with the point facing downwards, whereby the locking tongue opening 11 is engaged particularly easily by the locking tongue 9 when the girders are to be assembled.

Figure 9:
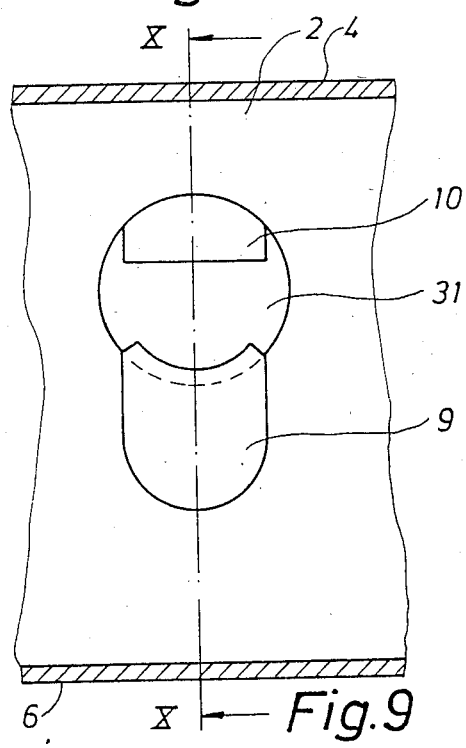
FIG. 9 is a side view, partly in section, of a fourth embodiment of the locking tongue and the locking gill means, whereby the locking tongue opening and the locking gill opening are the same opening.
Figure 10:
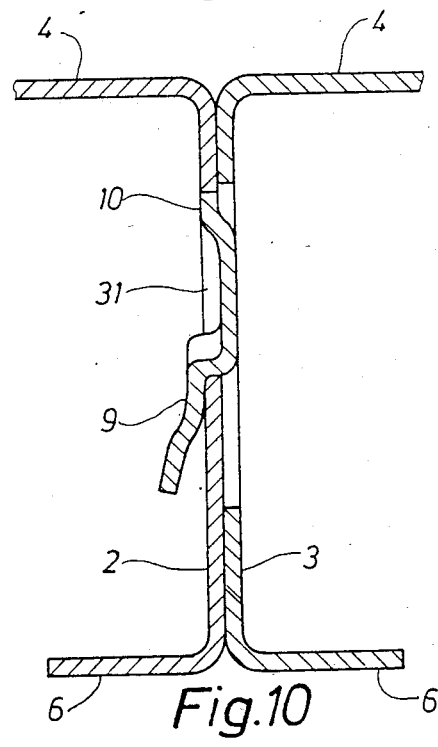
FIG. 10 is a sectional view taken along the line X—X of FIG. 9.

FIGS. 9 and 10 illustrate a fourth embodiment with one opening 31 forming both the locking gill opening and the locking tongue opening. In this manner the structure is particularly simple and inexpensive and furthermore very strong, the locking means being formed with the greatest possible dimensions relative to the height of the side members. The latter is rendered possible because not room need be provided between the openings, which is necessary when the locking gill and the locking tongue opening are separate openings.

It appears best from FIG. 3 that the locking gill 10 is bent so far outwards from the side member 3 that the inner rim 32 of its uppermost rim surface 13 preferably is flush with the outer side 22 of the side member 3. When assembling two girders, the above implies that the locking gill 10 only projects so far into the associated locking gill opening 12 of the adjacent girder that its upward rim surface 12 is made abutting the downward rim surface 14 of the locking gill opening 12.

The locking means 9, 11 and 10, 12 are arranged in pairs in a substantially horizontal row in the side members 2,3 of the girders, cf. FIGS. 1 and 6, whereby an easy and simple assembling of the girders are rendered possible.

The distance between succeeding pairs of locking means 9, 11 and 10, 12 corresponds to 3-15 times the height of the side members 2, 3, preferably to 7-11 times this height. In this manner the number of locking means present in the side members suffices for transferring the loads the deck structure should be able to absorb.

Together the height h' of the locking tongue opening and the height h" of the locking gill opening correspond in vertical direction to 0.2-0.6 times the height of the side membes 2, 3, preferably to 0.3-0.5 times said height. As a result the dimensions of the locking means suffices for transferring the forces which they are subjected to when the thin plate structure is loaded. At the same time the side members maintain a strength sufficient for absorbing the effects of the above loads.

The invention can be modified in several ways without thereby deviating from the scope thereof. Thus any combination of the above embodiments of the locking means is possible, and the locking tongue 9 can be placed in the side member 3 with the associated locking tongue opening 11 in the side member 2, whereas the locking gill 10 is placed in the same side member 2 with the assoiated locking gill opening 12 in the side member 3. Furthermore, the locking means can be oriented in such a manner that the locking tongue 9 faces upwards and the locking gill 10 faces downwards. Beyond extending in a horizontal plane the thin plate structure can extend in any plane such as for instance inclined relative to a horizontal plane.

A "thin plate" means everywhere in this application a sheet material of a thickness less than or equal to 3 mm.

The invention has been described with reference to a deck structure. Nothing, however, prevents the thin plate structure from being used for, for instance, shelves.

As to the resilience of the side members 2, 3 of the profiled girders 1 it is noted that it may be relatively low.

I claim:

1. A thin plate structure such as a deck structure for instance for a footbridge and comprising at least two abutting, substantially horizontally placed profiled girders, each girder comprising at least two substantially vertical, spaced, plate-shaped side members, the girders including a plurality of connecting means in the side members, characterized in that the connecting means are locking means comprising at least one downwardly pointing locking tongue integral with an associated one of the side members of each girder, said locking tongue extending outward in an offset manner along a bending area and downward therefrom, and furthermore cooperating with a locking tongue opening punched out opposite the locking tongue in an abutting side member of an adjacent girder, and in that the locking means comprises at least one upward locking gill cut out in one of the side members of each girder, said locking gill extending outward and upward in an offset manner along a generally horizontally extending bending area and furthermore co-operating with a locking gill opening punched out opposite the locking gill in the abutting side member of the adjacent girder, and that the side members furthermore are so resilient that they allow an insertion of the locking tongue and the locking gill into the locking tongue opening and the locking gill opening, respectively, the locking gill having an upper edge surface defining an upwardly-facing rim surface, and the locking gill opening having an opposed, downwardly-facing surface which abuts said rim surface of said locking gill, the bending area of the locking tongue having a downward side and the locking tongue opening have an upward rim surface which abuts said downward side, the locking tongue having an inner side which has an uppermost area, the abutting side member having an inner side abutting said uppermost area, said tongue and gill being spaced vertically and separated by a planar area of the side member.

2. A thin plate structure as claimed in claim 1, wherein, in each girder, each side member has an inner side and an outer side, and each locking tongue comprises a first tongue part extending downward from the bending area and engaging the inner side of one of said side members abutting the side member associated with said locking tongue, and a second tongue part bent outwards relative to said associated side member in an offset manner in extension of the first tongue part and extending downwards, the bending area of the locking tongue and the upward rim surface of the locking tongue opening having corresponding shapes.

3. A thin plate structure as claimed in claim 1, characterized in that the bending area of the locking tongue and the upward rim surface of the locking tongue opening are curved.

4. A thin plate structure as claimed in claim 1, characterized in that the bending area of the locking tongue and the upward rim surface of the locking tongue opening are V-shaped with points facing downwards.

5. A thin plate structure as claimed in claim 1, characterized in that the bending area of the locking tongue and the upward rim surface of the locking tongue opening extend straight on a generally horizontal plane, and that the locking tongue has side rims which converge to one another below the bending area.

6. A thin plate structure as claimed in claim 1, wherein the upwardly-facing rim surface of the locking gill has an inner rim which is flush with the outer side of the side member, and that the upwardly-facing rim surfce of the locking gill and the opposed, downwardly-facing surface of the locking gill opening have corresponding curvature.

7. A thin plate structure as claimed in claim 1, characterized in that the upwardly-facing surface of the locking gill and the opposed, downwardly facing surface of the locking gill opening are V-shaped with points facing upwards.

8. A thin plate structure as claimed in claim 1, characterized in that the upwardly-facing surface of the locking gill and the opposed, downwardly facing surface of the locking gill opening extend straight substantially in a horizontal plane.

9. A thin plate structure as claimed in claim 1, characterized in that the locking tongue opening and the locking gill opening are the same opening.

10. A thin plate structure as claimed in claim 1, characterized in that the distance between succeeding sets of locking means corresponds to 3–15 times the height H of the side members, preferably 7–11 times this height H.

11. A thin plate structure as claimed in claim 2, characterized in that the height h' of the locking tongue opening and the height h" of the locking gill opening together amount to between 0.2–0.6 times the height H of the side members, preferably 0.3–0.5 times this height H.

12. A thin plate structure as claimed in claim 2, characterized in that the bending area of the locking tongue and the upward rim surface of the locking tongue opening are curved.

13. A thin plate structure as claimed in claim 9, characterized in that the height h' of the locking tongue opening and the height h" of the locking gill opening together amount to between 0.2–0.6 times the height H of the side members, preferably 0.3–0.5 times this height H.

* * * * *

UNITED STATES PATENT AND TRADEMARK OFFICE
CERTIFICATE OF CORRECTION

PATENT NO. : 4,691,493

DATED : September 8, 1987

INVENTOR(S) : Anders Larson

It is certified that error appears in the above-identified patent and that said Letters Patent is hereby corrected as shown below:

```
Column 1, line 38, change "to" to --in--.
Column 3, line 38, change "manenr" to --manner--.
Column 3, line 56, change "sid emembers" to --side members--.
Column 4, line 15, change "but" to --abut--.
Column 4, line 16, change "linve" to --line--.
Column 4, line 52, after "manner" delete "," and insert--.--.
Column 5, line 36, change "a" to --a--.
Column 5, line 45, change "b" to --b--.
Column 5, line 53, after "locking tongue" insert--9--.
Column 6, line 33, change "not" to --no--.
Column 6, line 43, change "12" to --13--.
Column 6, line 56, change "h' " to --h'--.
Column 6, line 57, change "h" " to --h"--.
Column 8, line 48, change "h' " to --h'--.
Column 8, line 49, change "h" " to --h"--.
Column 8, line 58, change "h' " to --h'--.
```

UNITED STATES PATENT AND TRADEMARK OFFICE
CERTIFICATE OF CORRECTION

PATENT NO. : 4,691,493

DATED : September 8, 1987

INVENTOR(S) : Anders Larson

It is certified that error appears in the above-identified patent and that said Letters Patent is hereby corrected as shown below:

Column 8, line 59, change "h" " to --$\underline{h}$"--.

Signed and Sealed this

Fifteenth Day of March, 1988

Attest:

DONALD J. QUIGG

Attesting Officer

Commissioner of Patents and Trademarks